United States Patent
Itoh et al.

(10) Patent No.: US 9,758,666 B2
(45) Date of Patent: Sep. 12, 2017

(54) OXYGEN-ABSORBING RESIN COMPOSITION AND OXYGEN-ABSORBING MULTILAYER BODY USING THE SAME

(71) Applicant: MITSUBISHI GAS CHEMICAL COMPANY, INC., Tokyo (JP)

(72) Inventors: Takayoshi Itoh, Tokyo (JP); Emiko Yokose, Tokyo (JP); Kouta Kagimoto, Tokyo (JP); Jyun Wakabayashi, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 79 days.

(21) Appl. No.: 14/425,399

(22) PCT Filed: Sep. 6, 2013

(86) PCT No.: PCT/JP2013/074056
§ 371 (c)(1),
(2) Date: Mar. 3, 2015

(87) PCT Pub. No.: WO2014/038659
PCT Pub. Date: Mar. 13, 2014

(65) Prior Publication Data
US 2015/0203678 A1 Jul. 23, 2015

(30) Foreign Application Priority Data

Sep. 7, 2012 (JP) .................................. 2012-196994
Feb. 5, 2013 (JP) .................................. 2013-020269

(51) Int. Cl.
*C08L 53/02* (2006.01)
*B32B 27/18* (2006.01)
(Continued)

(52) U.S. Cl.
CPC .............. *C08L 53/02* (2013.01); *B32B 27/08* (2013.01); *B32B 27/18* (2013.01); *B32B 27/302* (2013.01); *B32B 27/32* (2013.01); *B32B 27/34* (2013.01); *B32B 27/36* (2013.01); *B65D 81/267* (2013.01); *C08F 2/54* (2013.01); *C08F 8/06* (2013.01);
(Continued)

(58) Field of Classification Search
CPC .... C08L 53/02; C08L 9/00; C08F 8/06; C08F 2/54; B32B 27/08; B32B 27/302; B32B 2250/04; B32B 2307/7244; B32B 2307/74; B32B 27/32; B32B 81/267; B32B 2250/24; B32B 2307/758; B32B 2439/70; B32B 27/34; B32B 27/18; B32B 27/36
USPC ............................................ 428/521; 525/99
See application file for complete search history.

(56) References Cited

U.S. PATENT DOCUMENTS

| 5,211,875 A | 5/1993 | Speer et al. |
| 2009/0061061 A1 | 3/2009 | Beckwith et al. |
| 2010/0133468 A1 | 6/2010 | Ishihara et al. |
| 2012/0064272 A1 | 3/2012 | Nakao et al. |

(Continued)

FOREIGN PATENT DOCUMENTS

| CN | 102149543 | 8/2011 |
| EP | 2319686 | 5/2011 |
| JP | 5-194949 | 8/1993 |
| JP | 2002-505575 | 2/2002 |

(Continued)

OTHER PUBLICATIONS

Search report from PCT/JP2013/074056, mail date is Oct. 15, 2013.
International Preliminary Examination Report in PCT/JP2013/074056 issued Mar. 10, 2015.

*Primary Examiner* — Douglas McGinty
(74) *Attorney, Agent, or Firm* — Greenblum & Bernstein, P.L.C.

(57) ABSTRACT

The present invention provides an oxygen-absorbing resin composition having a satisfactory oxygen absorption performance and suppressing the occurrence of odor after oxygen absorption, even in an aspect substantially containing no photoinitiator, and an oxygen-absorbing multilayer body using the oxygen-absorbing resin composition. An oxygen-absorbing resin composition initiating oxygen absorption by irradiation with an energy ray, the composition including an easily oxidizable thermoplastic resin and a transition metal catalyst, and wherein the easily oxidizable thermoplastic resin includes a polybutadiene (X) and a resin (Y) having carbon-carbon double bonds and the constitutional unit of the following general formula (1):

[Formula 1]

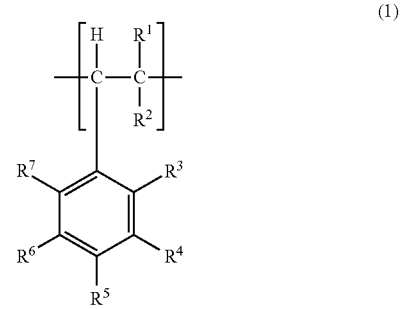

(wherein $R^1$ to $R^7$ each represent —H, —$CH_3$, —$CH_2R$, —$CHR_2$, —$CR_3$, —OR, —COOR, —$SiR_3$, —O—$SiR_3$, —COCl or a halogen atom, and may be the same as each other or different from each other, and R represents a linear or cyclic alkyl, alkenyl, halogenated alkyl, halogenated alkenyl or aryl group.)

3 Claims, 1 Drawing Sheet

(51) Int. Cl.
  *C08F 2/54* (2006.01)
  *C08F 8/06* (2006.01)
  *B32B 27/08* (2006.01)
  *B32B 27/30* (2006.01)
  *B32B 27/32* (2006.01)
  *B65D 81/26* (2006.01)
  *C08L 9/00* (2006.01)
  *B32B 27/34* (2006.01)
  *B32B 27/36* (2006.01)

(52) U.S. Cl.
  CPC ............ *C08L 9/00* (2013.01); *B32B 2250/03* (2013.01); *B32B 2250/04* (2013.01); *B32B 2250/24* (2013.01); *B32B 2255/10* (2013.01); *B32B 2255/20* (2013.01); *B32B 2264/102* (2013.01); *B32B 2270/00* (2013.01); *B32B 2307/7242* (2013.01); *B32B 2307/7244* (2013.01); *B32B 2307/74* (2013.01); *B32B 2307/758* (2013.01); *B32B 2439/70* (2013.01); *Y10T 428/31931* (2015.04)

(56) References Cited

U.S. PATENT DOCUMENTS

| | | |
|---|---|---|
| 2012/0237747 A1* | 9/2012 | Tai .................... B32B 27/08 428/216 |
| 2013/0030104 A1 | 1/2013 | Sakurai et al. |
| 2013/0123380 A1* | 5/2013 | Sumitani ............ B65D 81/266 522/12 |
| 2015/0353251 A1* | 12/2015 | Kagimoto ............... B32B 27/00 206/484.1 |

FOREIGN PATENT DOCUMENTS

| | | |
|---|---|---|
| JP | 2002-509484 | 3/2002 |
| JP | 2005-15055 | 1/2005 |
| JP | 2007-023193 | 2/2007 |
| JP | 2009-179672 | 8/2009 |
| JP | 2010-537849 | 12/2010 |
| WO | 98/51758 | 11/1998 |
| WO | 98/51759 | 11/1998 |
| WO | 2006/095640 | 9/2006 |
| WO | 2010/134137 | 11/2010 |
| WO | 2011/067198 | 6/2011 |
| WO | 2011/122548 | 10/2011 |

* cited by examiner

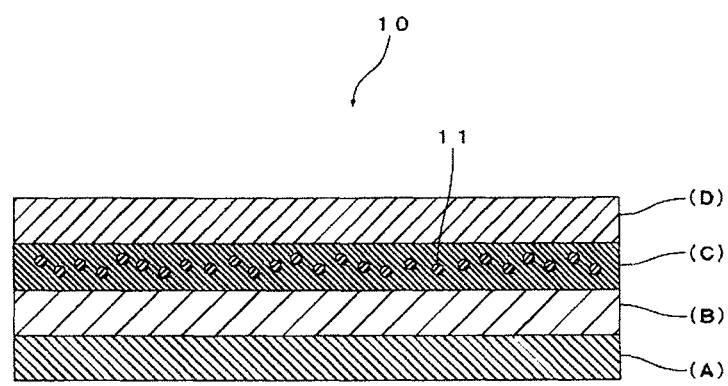

9,758,666 B2

OXYGEN-ABSORBING RESIN COMPOSITION AND OXYGEN-ABSORBING MULTILAYER BODY USING THE SAME

TECHNICAL FIELD

The present invention relates to an oxygen-absorbing resin composition which includes an easily oxidizable thermoplastic resin and a transition metal catalyst, and which initiates oxygen absorption by irradiation of the oxygen-absorbing resin composition with an energy ray; and an oxygen-absorbing multilayer body using the oxygen-absorbing resin composition.

BACKGROUND ART

For the purpose of preventing oxidation by oxygen and performing long-term storing of various goods tending to be affected by oxygen and accordingly deteriorated or degraded, typified by food, beverages, pharmaceuticals, medical supplies, cosmetics, metal products and electronic products, there have been used oxygen absorbing agents for removing oxygen inside the packaging containers or packaging bags containing these goods.

Recently, film-shaped oxygen absorbing agents being more easily handleable, applicable in wide ranges and extremely low in the possibility of accidental ingestion have been attracting attention, and many proposals have been put forward on the oxygen absorbing composition and the film structure of the film-shaped oxygen absorbing agents. From the viewpoint of maintaining the oxygen absorption performance of the film-shaped oxygen absorbing agent, it is desirable that the film-shaped oxygen absorbing agent be free from the occurrence of oxygen absorption when the film is formed, the film is processed into bags or the like and the film is stored; on the other hand, from the viewpoint of quickly exhibiting the oxygen absorption performance of the film-shaped oxygen absorbing agent when used, a film-shaped oxygen absorbing agent needing a trigger for initiating the oxygen absorption is desirable. A method has hitherto been proposed in which a photoinitiator is contained in a film containing, as an oxygen absorbing agent, a resin composition including a resin to be oxidized and a transition metal, and the oxygen absorption is initiated by using as a trigger the irradiation with ultraviolet ray (Patent Literature 1).

On the other hand, in the oxygen-absorbing resin composition containing a photoinitiator, the photoinitiator tends to migrate from the resin composition to the outside. Accordingly, when the resin composition is used as a packaging material, in particular, a food packaging material, the reduction of the migration amount of the photoinitiator is required. For this requirement, it has been proposed to use, as a photoinitiator having a smaller migration amount to the outside of the resin composition, a benzophenone derivative having a specific structure and being substantially non-extracting (Patent Literature 2 and Patent Literature 3).

CITATION LIST

Patent Literature

Patent Literature 1: Japanese Patent Laid-Open No. H05-194949
Patent Literature 2: National Publication of International Patent Application No. 2002-509484
Patent Literature 3: National Publication of International Patent Application No. 2002-505575

SUMMARY OF INVENTION

Technical Problem

However, in the techniques described in Patent Literature 2 and Patent Literature 3, it is necessary to use, as a photoinitiator, a specific material of a benzophenone derivative having a specific structure, and hence these techniques suffer from a problem of being relatively expensive. In this type of oxygen-absorbing resin composition, odor tends to occur as a by-product after the oxygen absorption, and hence from such a viewpoint, some improvement has been required. On the other hand, according to the findings of the present inventors, it has been revealed that when a multilayer body (multilayer film or multilayer sheet) is formed from the oxygen-absorbing resin composition containing a photoinitiator, a large number of gels occur in the film or sheet, accordingly surface defects called fish eyes tend to occur, and the visibility or the beauty of exterior appearance of the obtained multilayer body tends to be spoiled.

An object of the present invention is to solve the above-described problems in the oxygen-absorbing resin composition initiating oxygen absorption by irradiation with an energy ray. Specifically, an object of the present invention is to provide an oxygen-absorbing resin composition having a satisfactory oxygen absorption performance even with a relatively small content of the photoinitiator, and suppressing the occurrence of odor after oxygen absorption, and for example, an oxygen-absorbing multilayer body using the oxygen-absorbing resin composition. Another object of the present invention is to provide an oxygen-absorbing resin composition having a satisfactory oxygen absorption performance even in an aspect substantially containing no photoinitiator and being capable of easily and simply producing a multilayer body excellent in transparency and beauty of exterior appearance, and an oxygen-absorbing multilayer body using the oxygen-absorbing resin composition.

Solution to Problem

The present inventors made a diligent study in order to solve the above-described problems, and consequently have reached the present invention by discovering that an oxygen-absorbing resin composition combined with a specific easily oxidizable thermoplastic resin can quickly initiate oxygen absorption by irradiation with an energy ray, and unexpectedly exhibits an excellent oxygen absorption performance even when the amount used of the photoinitiator is reduced or the use of the photoinitiator is omitted; and by discovering that the migration of the photoinitiator to the outside can be drastically or completely suppressed by reducing or omitting the use of the photoinitiator, respectively, and unexpectedly the occurrence of odor after oxygen absorption is suppressed, and moreover an oxygen-absorbing multilayer body excellent in transparency and beauty of exterior appearance can be easily and simply produced.

Specifically, the present invention provide following <1> to <5>.

<1> An oxygen-absorbing resin composition initiating oxygen absorption by irradiation with an energy ray, the composition comprising:
an easily oxidizable thermoplastic resin and
a transition metal catalyst, wherein the easily oxidizable thermoplastic resin comprises a polybutadiene (X) and a resin (Y) having carbon-carbon double bonds and the constitutional unit represented by the following general formula (1):

[Formula 1]

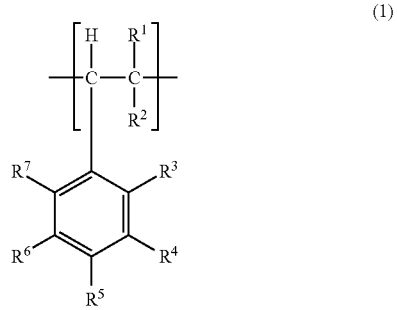

(1)

(wherein $R^1$ to $R^7$ each represent —H, —$CH_3$, —$CH_2R$, —$CHR_2$, —$CR_3$, —OR, —COOR, —$SiR_3$, —O—$SiR_3$, —COCl or a halogen atom, and may be the same as each other or different from each other, and R represents a linear or cyclic alkyl, alkenyl, halogenated alkyl, halogenated alkenyl or aryl group.)

<2> The oxygen-absorbing resin composition according to <1>, wherein the resin (Y) comprises a styrene-isoprene-styrene block copolymer and/or a styrene-butadiene-styrene block copolymer.

<3> The oxygen-absorbing resin composition according to <1> or <2>, wherein the resin (Y) is contained in an amount of 3 to 1000 parts by mass based on 100 parts by mass of the polybutadiene (X).

<4> An oxygen-absorbing multilayer body including at least an oxygen absorption layer comprising the oxygen-absorbing resin composition according to any one of <1> to <3>.

<5> The oxygen-absorbing multilayer body according to <4>, formed by laminating the following layers in the mentioned order:
an isolation layer (A) comprising a thermoplastic resin;
an oxygen absorption layer (B) comprising the oxygen-absorbing resin composition according to any one of <1> to <3>;
an odor absorption layer (C) comprising an odor-absorbing resin composition comprising a thermoplastic resin and an odor absorbing agent; and
an oxygen barrier layer (D) comprising an oxygen barrier substance.

Advantageous Effects of Invention

According to the present invention, in the oxygen-absorbing resin composition quickly initiating oxygen absorption by irradiation with an energy ray, while a satisfactory oxygen absorption performance is being maintained, the amount used or the use of the photoinitiator tending to migrate to the outside can be reduced or omitted, respectively. Moreover, an oxygen-absorbing resin composition suppressing the occurrence of odor after oxygen absorption can be achieved. Accordingly, there is provided an oxygen-absorbing resin composition especially useful in the field of packaging materials, in particular, food packaging materials. Moreover, according to the present invention, there can be achieved an oxygen-absorbing multilayer body excellent in transparency and beauty of exterior appearance.

BRIEF DESCRIPTION OF DRAWING

FIG. 1 shows a cross-sectional view illustrating an aspect of the oxygen-absorbing multilayer body according to the present invention.

DESCRIPTION OF EMBODIMENT

Hereinafter, the embodiment of the present invention is described. The following embodiment is presented as exemplification for describing the present invention, and the present invention is not limited only to the embodiment.

[Oxygen-Absorbing Resin Composition]

The oxygen-absorbing resin composition of the present embodiment includes a polybutadiene (X), a resin (Y) having carbon-carbon double bonds and the constitutional unit represented by the general formula (1), and a transition metal catalyst.

The oxygen-absorbing resin composition of the present embodiment include, as an easily oxidizable thermoplastic resin, the polybutadiene (X) and the resin (Y), both of which are essential components.

Examples of the polybutadiene (X) used in the present embodiment include, without being particularly limited to: 1,4-polybutadiene and 1,2-polybutadiene. From the viewpoint of the oxygen absorption performance and the suppression of odor, 1,2-polybutadiene is preferable.

The resin (Y) used in the present embodiment has carbon-carbon double bonds and the constitutional unit represented by the general formula (1). The carbon-carbon double bonds may be located in the main chain of the resin or in the side chains of the resin. Examples of the resin (Y) include, without being particularly limited to: styrene-isoprene-styrene block copolymer, styrene-butadiene-styrene block copolymer, styrene-butadiene rubber and styrene-isoprene rubber. Among these, styrene-isoprene-styrene block copolymer and styrene-butadiene-styrene block copolymer are preferable, and styrene-isoprene-styrene block copolymer is particularly preferable. The resins (Y) may be used each alone or in combinations of two or more thereof.

In the general formula (1), $R^1$ to $R^7$ each independently represent —H, —$CH_3$, —$CH_2R$, —$CHR_2$, —$CR_3$, —OR, —COOR, —$SiR_3$, —O—$SiR_3$, —COCl or a halogen atom. Rs in $R^1$ to $R^7$ each independently represent a linear or cyclic alkyl group, an alkenyl group, a halogenated alkyl group, a halogenated alkenyl group or an aryl group. The case where $R^1$ to $R^7$ are each —H is particularly preferable.

The oxygen-absorbing resin composition of the present embodiment can include easily oxidizable thermoplastic resins other than the polybutadiene (X) and the resin (Y) (hereinafter, also referred to as "other easily oxidizable thermoplastic resins"). Examples of the other easily oxidizable thermoplastic resins include: an organic polymer compound having moieties including carbon-carbon double bonds; an organic polymer compound having the constitutional units of the general formula (1); and an organic polymer compound having hydrogen atoms bonded to tertiary carbon atoms. The carbon-carbon double bonds in the organic polymer compound having moieties including carbon-carbon double bonds may be located either in the main chain of the polymer or in the side chains of the polymer. Typical examples of such an organic polymer compound include 1,4-polyisoprene, 3,4-polyisoprene, and ethylene-methyl acrylate-cyclohexenylmethyl acrylate copolymer.

Examples of the organic polymer compound having the constitutional unit of the general formula (1) include hydrogenated styrene-butadiene rubber and hydrogenated styrene-isoprene rubber. Examples of the organic polymer compound having hydrogen atoms bonded to tertiary carbon atoms include polypropylene and polymethyl pentene. The other easily oxidizable thermoplastic resins may be used each alone or in combinations of two or more thereof.

In the oxygen-absorbing resin composition of the present embodiment, in order to improve the dispersibility of other mixed components or in order to make faster the oxygen absorption rate by increasing the oxygen permeability of the oxygen absorption layer, additionally other types of thermoplastic resins (hereinafter, also simply referred to as "thermoplastic resins") may also be mixed. When a thermoplastic resin is mixed, the mixing amount of the thermoplastic resin is preferably 1 to 1000 parts by mass, more preferably 2 to 500 parts by mass and particularly preferably 5 to 200 parts by mass, based on 100 parts by mass of the easily oxidizable thermoplastic resin. In the case where the above-described preferable range is adopted, as compared to the case where the preferable range is not adopted, the oxygen absorption rate tends to be more increased. As the thermoplastic resin to be mixed, a resin having a high compatibility with the easily oxidizable thermoplastic resin or a resin exhibiting a high oxygen permeability when processed into film is preferable.

The mixing proportion of the resin (Y) used in the present embodiment is not particularly limited, but is preferably 3 to 1000 parts by mass, more preferably 5 to 500 parts by mass and particularly more preferably 10 to 200 parts by mass, based on 100 parts by mass of the polybutadiene (X). In the case where the above-described preferable range is adopted, as compared to the case where the preferable range is not adopted, the amount used of the photoinitiator tends to be able to be more reduced while the oxygen absorption rate is being maintained.

As the transition metal catalyst used in the present embodiment, a transition metal catalyst appropriately selected from the heretofore known transition metal catalysts can be used, without being particularly limited with respect to the type thereof, as long as the selected transition catalyst can function as the catalyst for the oxidation reaction of the polybutadiene (X).

Specific examples of the transition metal catalyst include organic acid salts, halides, phosphates, phosphites, hypophosphites, nitrates, sulfates, oxides and hydroxides of transition metals. Examples of the transition metal contained in the transition metal catalyst include, without being limited to: titanium, vanadium, chromium, manganese, iron, cobalt, nickel, copper, zinc, ruthenium and rhodium. Among these, manganese, iron, cobalt, nickel and copper are preferable. Examples of the organic acid include, without being limited to: acetic acid, propionic acid, octanoic acid, lauric acid, stearic acid, acetylacetone, dimethyldithiocarbamic acid, palmitic acid, 2-ethylhexanoic acid, neodecanoic acid, linoleic acid, tall oil acid, oleic acid, capric acid and naphthenic acid. The transition metal catalyst is preferably the combinations of these transition metals and these organic acids. Specifically, the combination of the transition metal such as manganese, iron, cobalt, nickel or copper and the organic acid such as octylic acid, neodecanoic acid, naphthenic acid or stearic acid is more preferable. In particular, the combination of the transition metal such as cobalt and the organic acid such as octylic acid or neodecanoic acid is particularly preferable. The transition metal catalysts can be used each alone or in combinations of two or more thereof.

The oxygen-absorbing resin composition of the present embodiment may also further include a carrier substance, if necessary. Alternatively, by allowing a carrier substance to support or to be impregnated with the transition metal catalyst, it is possible to prepare a support (hereinafter, also referred to as "transition metal catalyst support") in which the transition metal catalyst is supported by or impregnated into the carrier substance. By allowing the carrier substance to support or to be impregnated with the transition metal catalyst, the contact area with oxygen can be made larger and the oxygen absorption rate or the oxygen absorption amount can be increased, and the handling of the transition metal catalyst can be made simple and convenient because the transition metal catalyst support can be in a form of a powder. The type of the carrier substance is not particularly limited. For example, zeolite, diatom earth and calcium silicate can be used. As the carrier substance, an aggregate having a size of 0.1 to 200 μm catalyst at the time of preparation of the catalyst or after the preparation is preferable because of being excellent in handleability. The carrier substance to be disaggregated so as to have a size of 10 to 100 nm when dispersed in a resin is preferable because such a carrier gives a transparent resin composition when mixed in a resin. Examples of such a carrier substance include synthetic calcium silicate. The mixing proportion of the transition metal catalyst is not particularly limited, but is preferably 0.001 to 10 parts by mass and particularly preferably 0.01 to 1 part by mass in terms of the transition metal amount, based on 100 parts by mass of the oxygen-absorbing resin composition, from the viewpoint of the oxygen absorption performance, physical strength and economic efficiency.

Examples of the energy ray with which the oxygen-absorbing resin composition is irradiated to initiate oxygen absorption include, without being particularly limited to: ultraviolet ray, electron beam, α-ray, β-ray, γ-ray and X-ray. The irradiation with the energy ray breaks the carbon-hydrogen bonds or the carbon-carbon bonds in the easily oxidizable thermoplastic resin to produce radicals, and thus can initiates the oxidation reaction. Alternatively, the application of the energy in the form of heat, high frequency wave or supersonic wave can also initiate oxygen absorption.

The oxygen-absorbing resin composition of the present embodiment may also include a photoinitiator from the viewpoint of more enhancing the oxygen absorption performance or from the viewpoint of reducing the irradiation quantity of the energy ray. As the photoinitiator, for example, a hydrogen abstraction type initiator and an intramolecular cleavage type initiator are known. The hydrogen abstraction type initiator initiates an oxidation reaction by producing an active radical through the abstraction of hydrogen from the resin caused by the excited initiator molecule. The intramolecular cleavage type initiator produces a radical through the cleavage of the excited initiator molecule, and the resulting radical is added to the double bond sites in the resin to newly produce a radical. The newly produced radical further abstracts hydrogen from the resin to produce an active radical so as to allow the oxidation reaction to proceed. Examples of the hydrogen abstraction type initiator include, without being particularly limited to: benzophenones, thiazines, metal porphyrins, anthraquinones, xanthones, thioxanthones, fluorenones and benzoquinones. Among these, fluorenones, thioxanthones and anthraquinones are preferable. On the other hand, examples of the intramolecular cleavage type initiator include, without being particularly limited to: α-hydroxy ketones (such as Irgacure 127, Irgacure 184 and Irgacure 2959), benzyl ketals (such as Irgacure 651), acylphosphine oxides (such as Darocur TPO and Irgacure 819), oxime esters (such as Irgacure OXE01 and Irgacure OXE02). Among these, α-hydroxy ketones and acylphosphine oxides are preferable. The content percentage of the photoinitiator is preferably 0 to 1% by mass based on the total amount of the oxygen-absorbing resin composition from the viewpoint of more enhancing the oxygen absorption performance or from the viewpoint of reducing the irradiation quantity of the energy ray. Moreover, it is preferable not to substantially include the photoinitiator from the viewpoint of suppressing the migration of the photoinitiator from the oxygen-absorbing resin composition to the outside and enhancing the transparency or the beauty of the exterior appearance of the obtained film or sheet. Here, no substantial inclusion of the photoinitiator means that the content percentage of the photoinitiator is 0% by mass or more and less than 0.1% by mass based on the total amount of the oxygen-absorbing resin composition. The content percentage of the photoinitiator is more preferably 0% by mass or more and less than 0.01% by mass, furthermore preferably 0% by mass or more and less than 0.001% by mass and most preferably 0% by mass. In the case where the mixing proportion of the photoinitiator falls within the above-described preferable range, as compared to the case where the mixing proportion of the photoinitiator falls outside the above-described preferable range, the possibility of the migration of the photoinitiator to the outside can be made lower while the oxygen absorption rate is being maintained. In particular, the oxygen-absorbing resin composition of the present embodiment preferably does not include, as the photoinitiator, the benzophenone-based photoinitiators.

The oxygen-absorbing composition can be converted into a composition having the oxygen absorption function in combination with another function such as drying function by mixing one or more selected from a drying agent, an adsorbing agent, an antibacterial agent and a coloring agent with the oxygen-absorbing composition. A multilayer body can also be prepared which includes a layer of the oxygen-absorbing composition and a layer(s) including one or more selected from a drying agent, an adsorbing agent, an antibacterial agent and a coloring agent.

The oxygen-absorbing resin composition can be produced by mixing, for example, the easily oxidizable thermoplastic resin and a resin composition including the transition metal catalyst at a temperature equal to or higher than the highest melting temperature of the respective resins. Alternatively, the oxygen-absorbing resin composition can also be produced by mixing the easily oxidizable thermoplastic resin and the transition metal catalyst at a temperature equal to or higher than the melting temperature of the resin. Additionally, the oxygen-absorbing resin composition can also be produced by mixing a powder-like transition metal catalyst or a resin composition (masterbatch) including the transition metal catalyst in a high concentration and the easily oxidizable thermoplastic resin at a temperature equal to or higher than the highest melting temperature of the resin composition and the thermoplastic resin.

The oxygen-absorbing resin composition of the present embodiment can be formed into a pellet-shaped, film-shaped or sheet-shaped oxygen absorbing agent by melt kneading the easily oxidizable thermoplastic resin and the resin composition including the transition metal catalyst with, for example, an extrusion molding machine. Examples of the form of use of the oxygen absorbing agent include an oxygen absorbing agent having a form processed into a small piece-shaped oxygen absorbing agent such as a pellet-shaped oxygen absorbing agent, a film-shaped oxygen absorbing agent or other shaped oxygen absorbing agent, or an oxygen absorbing agent package having a form in which the oxygen absorbing agent is packed in a small air-permeable bag. Such a piece-shaped oxygen absorbing agent can be molded into a form such as a label, a card or a packing and used as an oxygen scavenging body.

[Oxygen-Absorbing Multilayer Body]

Moreover, the oxygen-absorbing resin composition of the present embodiment can be used, as it is or as laminated on an appropriate packaging material, as an oxygen scavenging packaging material, in a part or the whole of a packaging bag or a packaging container. For example, an oxygen-absorbing multilayer body can be formed by using the oxygen-absorbing resin composition of the present embodiment as an oxygen absorption layer (B), and by laminating on one side of the oxygen absorption layer (B) a thermoplastic resin having high oxygen permeability and having at the same time thermal adhesiveness as an isolation layer (A) against the content to be packaged, and laminating on the other side a resin, a metal or a metal oxide low in oxygen permeability as a gas barrier layer (D).

The oxygen-absorbing multilayer body of the present embodiment can further be provided with an odor absorption layer (C). The order of lamination is not limited at all; however, from the viewpoint of the oxygen absorption performance and the suppression of odor, a multilayer body formed by laminating the isolation layer (A), the oxygen absorption layer (B), the odor absorption layer (C) and the oxygen barrier layer (D) in this order is preferable.

The oxygen-absorbing resin composition of the present embodiment can be made transparent, and is accordingly suitable as a packaging material having transparency. In particular, an oxygen-absorbing multilayer body having a basic structure of: a polyolefin layer/a layer of the oxygen-absorbing resin composition of the present embodiment/a transparent gas barrier resin layer, can be used as a transparent oxygen scavenging packaging material. Examples of the transparent gas barrier resin layer may include: various vapor deposited films formed by vapor depositing silica or alumina on thermoplastic resins such as polyester and polyamide; and layers formed of polyamide, polymetaxylene adipamide (polyamide MXD6), ethylene-vinyl alcohol copolymer, or vinylidene chloride.

Hereinafter, an embodiment of the present invention is described with reference to an accompanying drawing. FIG. 1 shows a cross-sectional view illustrating an aspect of the oxygen-absorbing multilayer body according to the present invention. In the oxygen-absorbing multilayer body 10 shown in FIG. 1, (A) indicates an isolation layer, and includes a thermoplastic resin. (B) indicates an oxygen absorption layer, and is composed of an easily oxidizable thermoplastic resin and an oxygen-absorbing resin composition including a transition metal catalyst. (C) indicates an odor absorption layer, and is composed of a thermoplastic resin and an odor-absorbing resin composition including an odor absorbing agent 11. (D) indicates an oxygen barrier layer, and includes an oxygen barrier substance. In FIG. 1, reference numeral 11 denotes an odor absorbing agent.

Hereinafter, the isolation layer (A), the oxygen absorption layer (B), the odor absorption layer (C), the oxygen barrier layer (D) and the like constituting the oxygen-absorbing multilayer body 10 of the present embodiment are described in detail.

[Isolation Layer (A)]

The isolation layer (A) constituting the oxygen-absorbing multilayer body 10 of the present embodiment plays the role of isolating the oxygen absorption layer (B) and the packed object from each other, and, at the same time, plays a role of as a sealant. The isolation layer (A) also plays a role of performing efficient oxygen permeation so as not to disturb the quick oxygen absorption by the easily oxidizable thermoplastic resin included in the oxygen-absorbing resin composition constituting the oxygen absorption layer (B).

In the isolation layer (A), the oxygen permeability measured under the conditions of 23° C. and a relative humidity of 60% is preferably 1000 mL/(m²·day·atm) or more, more preferably 3000 mL/(m²·day·atm) or more and furthermore preferably 5000 mL/(m²·day·atm) or more. In the case where the oxygen permeability is equal to or larger than the above-described preferable value, as compared to the case where the oxygen permeability is less than the above-described preferable value, the oxygen absorption rate of the oxygen absorption layer (B) can be more increased.

Examples of the thermoplastic resin usable in the isolation layer (A) include, without being particularly limited to: polyolefin resins such as polyethylene, ethylene-α-olefin copolymer, polypropylene, propylene-ethylene random copolymer, propylene-ethylene block copolymer and ethylene-cyclic olefin copolymer; ethylene-based copolymers such as ethylene-(meth)acrylic acid copolymer, ethylene-methyl (meth)acrylate copolymer, various ion cross-linked products of ethylene-(meth)acrylic acid copolymer and ethylene-vinyl acetate copolymer; synthetic rubber-based resins such as polybutadiene, polyisoprene and styrene-butadiene copolymer, and the hydrogenated resins of these; soft polyvinyl chloride; polystyrene; polymethyl pentene; silicone resin; and copolymers between polysiloxane and other resins. These can be used each alone or in combinations of two or more thereof.

The thickness of the isolation layer (A) is not particularly limited. Usually, when the isolation layer (A) is thin, the oxygen absorption rate of the oxygen-absorbing multilayer body tends to be increased. Accordingly, the thickness of the isolation layer (A) is preferably 1 to 100 μm and more preferably 1 to 20 μm. In the case where the above-described preferable range is adopted, as compared to the case where the preferable range is not adopted, preferably the oxygen absorption rate of the oxygen-absorbing multilayer body can be increased, and at the same time, the flexibility as a packaging material can be maintained.

In the oxygen-absorbing multilayer body of the present embodiment, the isolation layer (A) is preferably designed as an acidic gas-absorbing isolation Layer (Aa) composed of an acidic gas-absorbing resin composition (a) including an acidic gas-absorbing agent and a thermoplastic resin. By forming the isolation layer (A) as the acidic gas-absorbing isolation layer (Aa), the acidic gas by-produced by the oxygen absorption reaction can be absorbed, and the odor caused by the acidic gas can be suppressed.

The acidic gas-absorbing agent used in the isolation layer (A) of the present embodiment is a compound chemically and/or physically fixing the odor component mainly derived from carboxylic acids. The acidic gas-absorbing agent used in the present embodiment is preferably a basic compound.

As the basic compound, for example, the hydroxides, carbonates, hydrogencarbonates and oxides of the group 1 and group 2 elements of the periodic table, the carbonates of the group 1 and group 2 elements of the periodic table are preferable, and the hydroxides and the oxides of the group 2 elements of the periodic table are particularly preferable. Among these, for example, sodium hydroxide, potassium hydroxide, calcium hydroxide, magnesium hydroxide, sodium carbonate, potassium carbonate, calcium carbonate, magnesium carbonate, sodium hydrogencarbonate, potassium hydrogencarbonate, calcium hydrogencarbonate, calcium oxide and magnesium oxide are preferable, and magnesium oxide is particularly preferable. Basic organic compounds can also be used, and typical examples of the usable basic organic compound include amine compounds having a non-covalent electron pair on the nitrogen. These can be used each alone or in combinations of two or more thereof.

The mixing proportion of the acidic gas absorbing agent in the isolation layer (A) is not particularly limited, but is preferably 0.01 to 50 parts by mass, more preferably 0.1 to 10 parts by mass and particularly preferably 1 to 5 parts by mass, based on 100 parts by mass of the thermoplastic resin included in the acidic gas-absorbing resin composition (a). In the case where the above-described preferable range is adopted, as compared to the case where the preferable range is not adopted, preferably the generated acidic gas can be sufficiently absorbed, and at the same time, the oxygen permeability of the acidic gas-absorbing isolation layer (Aa) can be more increased.

The acidic gas-absorbing resin composition (a) constituting the acidic gas-absorbing isolation layer (Aa) can be produced, for example, by mixing a thermoplastic resin and a powder-like acidic gas absorbing agent at a temperature equal to or higher than the melting temperature of the thermoplastic resin.

[Oxygen Absorption Layer (B)]

The oxygen absorption layer (B) constituting the oxygen-absorbing multilayer body 10 of the present embodiment is composed of the oxygen-absorbing resin composition. Here, the polybutadiene (X), the resin (Y) and the transition metal catalyst are the same as above-described explanation regarding the oxygen-absorbing resin composition, and duplicated descriptions thereof are omitted herein.

The thickness of the oxygen absorption layer (B) is not particularly limited, but is preferably 1 to 300 μm and more preferably 1 to 200 μm. In the case where the above-described preferable range is adopted, as compared to the case where the preferable range is not adopted, preferably the oxygen absorption rate of the oxygen-absorbing multilayer body 10 can be increased, and at the same time, the flexibility as a packaging material can be maintained.

In the oxygen absorption layer (B), an inorganic base and an amine compound may also be included in the oxygen-absorbing resin composition. However, in the oxygen-absorbing resin composition of the oxygen absorption layer (B), the total content percentage of the inorganic base and the amine compound is preferably 0 to 1% by mass and particularly preferably 0 to 0.1% by mass. In the case where the above-described preferable range is adopted, as compared to the case where the preferable range is not adopted, the oxygen absorption performance of the oxygen-absorbing multilayer body 10 can be more improved.

The above-described inorganic base means an inorganic compound exhibiting basicity, and does not involve the easily oxidizable thermoplastic resin, the transition metal catalyst and the photoinitiator.

The amine compound allowed to be included in the oxygen absorption layer (B) means a compound containing a primary, secondary or tertiary amine, or quaternary ammonium ion, and does not involve the easily oxidizable thermoplastic resin, the transition metal catalyst and the photoinitiator.

In the oxygen-absorbing resin composition constituting the oxygen absorption layer (B), the total content percentage of the inorganic base and the amine compound is preferably 0% by mass. In the case where the oxygen absorption layer (B) does not include the inorganic base and the amine compound, as compared to the case where the inorganic base and/or the amine compound is included in the oxygen-absorbing resin composition, the oxygen absorption performance of the oxygen-absorbing multilayer body 10 can be further improved.

The condition that the total content percentage of the inorganic base and the amine compound in the oxygen-absorbing resin composition is 0% by mass means that the oxygen-absorbing resin composition has the following constitution. Specifically, when the oxygen-absorbing resin composition includes the easily oxidizable thermoplastic resin, the transition metal catalyst and a sub-component, the total content percentage of the easily oxidizable thermoplastic resin, the transition metal catalyst and the sub-component in the oxygen-absorbing resin composition is 100% by mass. Here, the sub-component means at least one component selected from the group consisting of the above-described photoinitiator, a thermoplastic resin other than the above-described easily oxidizable thermoplastic resin and additives. The sub-components as referred to herein component are different from the above-described inorganic base and amine compound.

[Odor Absorption Layer (C)]

The odor absorption layer (C) of the oxygen-absorbing multilayer body 10 of the present embodiment is composed of a thermoplastic resin and an odor-absorbing resin composition including an odor absorbing agent 11.

The thickness of the odor absorption layer (C) is not particularly limited, but is preferably 1 to 300 and more preferably 1 to 200 μm. In the case where the above-described preferable range is adopted, as compared to the case where the preferable range is not adopted, preferably the absorption amount of the odorous component can be made larger, and the flexibility as a packaging material can be maintained.

The odor absorbing agent 11 is a substance chemically and/or physically fixing the odorous component mainly derived from aldehydes. As the odor absorbing agent 11, an amine compound or a physical adsorbing agent can be used. These may be used each alone or in combinations of two or more thereof to serve as the odor absorbing agent 11, or these may be used in combination with other substances to serve as the odor absorbing agent 11. Commercially available deodorants having the above-described functions can also be used as odor absorbing agent 11.

The content percentage of the amine compound in the odor absorption layer (C) is not particularly limited, but is preferably 0.01 to 50 parts by mass and particularly preferably 0.1 to 10 parts by mass, based on 100 parts by mass of the thermoplastic resin included in the odor-absorbing resin composition.

Examples of the amine compound include, without being particularly limited to: aliphatic amines, aromatic amines, tetraalkylammonium hydroxides, hydrazine derivatives, guanidine derivatives and urea derivatives. These can be used each alone or in combinations of two or more thereof.

Examples of the aliphatic amine include: methylamine, ethylamine, dimethylamine, diethylamine, trimethylamine, triethylamine, ethylenediamine, tetramethylethylenediamine, hexamethylenediamine, diethylenetriamine, triethylenetetramine, tetraethylenepentamine, pentaethylenehexamine, spermidine, spermine, diazabicycloundecene, ether amine, triethanolamine, N,N-diisopropylethylamine, piperidine, piperazine, morpholine, quinuclidine, amantadine and amino acids.

Examples of the aromatic amine include pyridine, 4-dimethylaminopyridine, aniline, 4-aminobenzoic acid and the salts thereof, 4-aminobenzenesulfonic acid and the salts thereof, toluidine, benzidine, catechol amine, phenetylamine and 1,8-bis(dimethylamino)naphthalene.

Examples of the tetraalkylammonium hydroxide include tetramethylammonium hydroxide and tetraethylammonium hydroxide.

The hydrazine derivatives are N—NH$_2$ group-containing organic substances such as hydrazine or the derivatives thereof, phenylhydrazine or the derivatives thereof, semicarbazide, hydrazide or the derivatives thereof, amino guanidine derivatives and hydrazine double salts. Specific examples of the hydrazine derivatives include: hydrazine, hydrazine sulfate, hydrazine hydrochloride, monomethylhydrazine, 1,1-dimethylhydrazine, aluminum sulfate hydrazine double salt, carbazic acid, formohydrazide, isopropylhydrazine sulfate, tert-butylhydrazine hydrochloride, 1-aminopyrrolidine, aminoguanidine sulfate, aminoguanidine hydrochloride, aminoguanidine bicarbonate, diaminoguanidine hydrochloride, triaminoguanidine sulfate, acetohydrazide, benzohydrazide, pentanohydrazide, carbohydrazide, cyclohexanecarbohydrazide, benzenesulfono hydrazide, thiocarbohydrazide, thiobenzohydrazide, pentanimidohydrazide, benzohydrazonohydrazide, adipic acid dihydrazide, sebacic acid dihydrazide, dodecanediohydrazide, isophthalic acid dihydrazide, propionic acid hydrazide, salycylic acid hydrazide, 3-hydroxy-2-naphthoic acid hydrazide, oxamic acidhydrazide, oxalyldihydrazide, benzophenone hydrazone, N-amino polyacrylamide, thiosemicarbazide, 4-methylthiosemicarbazide, 4,4-dimethyl-3-thiosemicarbazide, semicarbazide hydrochloride and 4-amino-1,2,4-triazole.

The aminoguanidine derivatives are the hydrazine derivatives having the guanidine structure and being represented by the following general formula (2) or the salts thereof. Specific examples of the aminoguanidine derivatives include aminoguanidine sulfate and aminoguanidine hydrochloride.

[Formula 2]

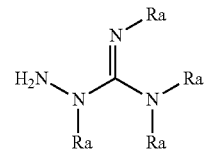

(2)

(wherein Ras each independently represent any element and/or a monovalent substituent.)

The urea derivatives are the compounds having the structure represented by the following general formula (3) and having no N—NH$_2$ group in the molecules thereof. Specific examples of the urea derivatives include: urea, 1-methylurea, 1,1-dimethylurea, 1,3-dimethylurea, ethylurea, 1,1-diethylurea, 1,3-diethylurea, allylurea, acetylurea, 1-acetyl-3-methylurea, hydroxyurea, 2-hydroxyethylurea, 1,3-(hydroxymethyl)urea, nitrourea, acetone semicarbazone, acetaldehyde semicarbazone, azodicarvone amide, ethylene urea, 1-acetyl-2-imidazolidinone, hydantoin, 1-allylhydantoin, glycoluril, allantoin, biuret, biurea, thiourea, N-methylthiourea, 1,3-dimethylthiourea, trimethylthiourea, 1,3-diethyl-2-thiourea, N,N'-diisopropylthiourea, 1-allyl-2-thiourea, 1-acetyl-2-thiourea, acetone thiosemicarbazone, ethylene thiourea, 4,4-dimethyl-2-imidazolidinethione, guanylthiourea and 2,5-dithiobiurea.

[Formula 3]

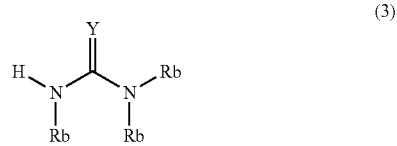

(3)

(wherein Rbs each independently represent any element and/or any substituent other than an amino group (—NH$_2$), and Y represents an oxygen atom or a sulfur atom.)

The guanidine derivatives are the compounds having the structure represented by the following general formula (4) and having no N—NH$_2$ group in the molecules thereof. Specific examples of the guanidine derivatives include: guanidine, 1-methylguanidine hydrochloride, cyanoguanidine, 1-ethyl-3-quanidinothiourea hydrochloride, creatinine, creatinine hydrate, 2,4-diamino-1,3,5-triazine, 2,4-diamino-6-methyl-1,3,5-triazine, 2-vinyl-4,6-diamino-1,3,5-triazine, 2-chloro-4,6-diamino-1,3,5-triazine, 2,4-diamino-6-dimethyl amino-1,3,5-triazine, 2,4-diamino-6-methoxy-1,3,5-triazine, 2,4-diamino-6-isopropoxy-1,3,5-triazine, 2-amino-4-methoxy-6-methyl-1,3,5-triazine, ammeline, ammelide, melamine, trichloromelamine, 2-aminopyrimidine, 2,4-diaminopyrimidine, 2,4,6-triaminopyrimidine, 2,4,6-triamino-5-nitrosopyrimidine, 2-amino-4-methylpyrimidine, 2-amino-5-nitropyrimidine, 2-amino-5-chloropyrimidine, 2-amino-5-bromopyrimidine, 2-aminobenzimidazole, 2-aminopurine, 2,6-diaminopurine, guanine, 6-thioguanine, 3-amino-1,2,4-triazole and 3,5-diamino-1,2,4-triazole.

[Formula 4]

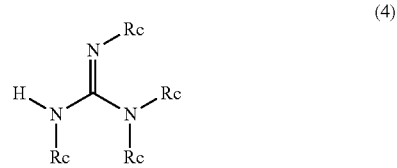

(4)

(wherein Rc represents any element and/or any substituent other than an amino group (—NH$_2$).)

Among the amine compounds quoted above as examples, from the viewpoint of the odor absorption performance as the odor absorbing agent 11, aromatic amines, hydrazine derivatives, guanidine derivatives or urea derivatives are preferable; among these, 4-amino benzoic acid and the salts thereof, 4-amino benzenesulfonic acid and the salts thereof and aminoguanidine sulfate are particularly preferable.

As the odor absorbing agent 11 of the odor absorption layer (C), a physical adsorbing agent can also be preferably used. Examples of the physical adsorbing agent include: activated carbon, activated clay, acid clay, natural zeolite, synthetic zeolite, bentonite, sepiolite, silica gel and silica-magnesia. As the odor absorbing agent 11, synthetic zeolite and silica gel are particularly preferable. These may be used each alone or in combinations of two or more thereof. The physical adsorbing agent as referred to herein does not involve the above-described easily oxidizable thermoplastic resin, transition metal catalyst and photoinitiator.

The above-described synthetic zeolite is industrially synthesized from a synthesis material such as sodium silicate or sodium aluminate, or from a natural material such as coal ash or shirasu; the synthetic zeolite means a zeolite higher in purity and smaller in average particle size as compared with natural zeolite. Synthetic zeolite is available as a hydrophilic or hydrophobic type, and any of these types can be used. In particular, hydrophobic synthetic zeolite is preferable.

The above-described silica gel is a material represented by the general formula $SiO_2 \cdot nH_2O$, and is a porous silicon dioxide having pores formed by three-dimensional aggregation of primary particles of silicate sol.

The silica gel also has a function as a drying agent, and accordingly an odor-absorbing resin composition using the silica gel has not only odor absorption capacity but also moisture absorption capacity.

As the above-described physical adsorbing agent, a physical adsorbing agent having a particle size of 0.1 to 50 μm and a specific surface area of 100 m$^2$/g or more is desirable because when the physical adsorbing agent is mixed with a resin composition, a resin composition being transparent and having a high odor absorption capacity is obtained.

Alternatively, for example, an odor absorbing agent may also be prepared by allowing a carrier to support an amine compound; the use of the odor absorbing agent in this mode is more preferable because physical adsorption of aldehydes to the carrier can be expected. The type of the carrier is not particularly limited. As the carrier, for example, zeolite, diatom earth, calcium silicate, porous silicas and activated clay can be used. Among these, calcium silicate, porous silicas and activated clay are preferable. The amount of a hydrazine derivative, a urea derivative or a guanidine derivative to be supported by the carrier is not particularly limited, but is preferably 0.001 to 30 mmol/(g-carrier) and particularly preferably 0.01 to 10 mmol/(g-carrier).

The odor-absorbing resin composition constituting the odor absorption layer (C) can be produced, for example, by mixing a thermoplastic resin and a resin composition including the odor absorbing agent 11 at a temperature equal to or higher than the highest melting temperature of the respective resins. Alternatively, the odor-absorbing resin composition can also be produced by mixing a resin composition including the thermoplastic resin and the powder-like odor absorbing agent 11 at a temperature equal to or higher than the melting temperature of the resin composition. Additionally, the odor-absorbing resin composition can also be produced by mixing a resin composition (masterbatch) including the odor absorbing agent 11 in a high concentration and the thermoplastic resin at a temperature equal to or higher than the highest melting temperature of the resin composition and the thermoplastic resin.

[Oxygen Barrier Layer (D)]

The oxygen barrier substance constituting the oxygen barrier layer (D) means a substance having an oxygen permeability of 100 cc/(m$^2 \cdot$24 h·atm) or less. Typical examples of the oxygen barrier substance include: various vapor deposited films formed by vapor depositing silica or alumina on a thermoplastic resin such as polyester or polyamide; and layers including polyamide MXD6, ethylene-vinyl alcohol copolymer, or vinylidene chloride. The thickness of the oxygen barrier layer (D) is not particularly limited, but is preferably 1 to 300 μm and more preferably 1 to 100 μm. In the case where the above-described preferable range is adopted, as compared to the case where the preferable range is not adopted, preferably a sufficient oxygen barrier effect is obtained, and at the same time, more preferable flexibility as a packaging material is possessed.

EXAMPLES

Hereinafter, the present invention is described in more detail with reference to Examples and Comparative Examples, but the present invention is not limited by these Examples and Comparative Examples. In following Examples and Comparative Examples, on the basis of the evaluation methods presented below, the measurement of the oxygen absorption amount, the odor organoleptic evaluation, the measurement of the oxygen scavenging time and the measurement of the odorous organic substance release concentrations were performed.

(Measurement of Oxygen Absorption Amount)

An oxygen-absorbing multilayer body was cut out to a size of 100 mm×100 mm to prepare a multilayer body specimen, and the acidic gas absorption layer side of the multilayer body specimen was irradiated with the ultraviolet ray of an illuminance of 9.8 mW/cm$^2$ from a 1-kW high-pressure mercury lamp as a light source for 90 seconds (irradiance: 880 mJ/cm$^2$). Subsequently, the multilayer body specimen was enclosed in a bag provided with a silica vapor deposited polyethylene terephthalate film as an oxygen barrier layer (hereinafter, referred to as an oxygen barrier bag) together with 240 mL of air, and the bag was sealed. Then, the bag was allowed to stand under the conditions of 25° C. and 60% RH. After being allowed to stand for 24 hours and 48 hours, the oxygen concentrations in the bag were measured, and the oxygen absorption amounts per 1 cm$^2$ of the multilayer body were calculated.

(Measurement of Oxygen Scavenging Time)

The oxygen-absorbing multilayer body was irradiated with the ultraviolet ray of an illuminance of 9.8 mW/cm$^2$ from a 1-kW high-pressure mercury lamp as a light source for 90 seconds (irradiance: 880 mJ/cm$^2$). Subsequently, the multilayer body was processed to form bags having an oxygen absorbing surface area of 500 cm$^2$. Then, 240 mL of air (initial oxygen amount: 0.10 mL/cm$^2$) was enclosed in a bag, and the opening of the bag was sealed to prepare a sealed bag. Additionally, 240 mL an oxygen 2 vol %-nitrogen 98 vol % gas (initial oxygen amount: 0.01 mL/cm$^2$) was enclosed in another bag, and the opening of the bag was sealed to prepare another sealed bag. Then, these sealed bags were allowed to stand under the conditions of 25° C. and 60% RH, and for each of the sealed bags, the time elapsed until the oxygen concentration reached 0.1 vol % was measured. Hereinafter, the time required for the oxygen concentration in each of the bags to decrease to 0.1 vol % is referred to as the "oxygen scavenging time."

(Odor Organoleptic Evaluation)

After the completion of the measurement of the oxygen scavenging time, the odor in each of the bags was subjected to an organoleptic evaluation, and the evaluation result was represented by the following symbols. In the odor organoleptic evaluation, 0 to ++ were determined to be acceptable.

0: No offensive smell occurs.
+: Slight offensive smell is sensed.
++: Some offensive smell is sensed.
+++: Offensive smell is sensed.

(Measurement of Odorous Organic Substance Release Concentrations)

In the measurement of the oxygen scavenging time, after the oxygen concentration in a bag was decreased to 0.1 vol %, the concentration of the aldehydes in the bag and the concentration of the carboxylic acids in the bag were measured, respectively, with a gas detector tube for acetaldehyde (Acetaldehyde 92L (for low concentration) or 92M (for intermediate concentration), manufactured by Gastec Corp.) and a gas detector tube for acetic acid the odorous organic substance release concentrations were measured.

In Examples and Comparative Examples presented below, the following various masterbatches were used to prepare oxygen-absorbing multilayer bodies.

(Oxygen Absorption Layer Masterbatch)

A cobalt octylate solution (cobalt octylate:solvent=1:1 mass ratio, Co content: 8% by mass) and a synthetic calcium silicate powder (average particle size: 2 µm) were mixed in a mass ratio of 2:1 to yield a powder-like product. The obtained powder-like product and a linear low-density polyethylene (hereinafter, denoted as "LLPDE") were melt-kneaded in a mass ratio of 2:8 at 170° C. with a twin screw kneading extruder to prepare an oxygen absorption layer masterbatch 1 (OA-MB1).

(Odor Absorption Layer Masterbatch 1)

An aqueous solution of aminoguanidine sulfate (hereinafter, denoted as "AGS"), an amine compound, was impregnated into a silica powder (average particle size: 4 µm) and dried to yield an AGS support (supported amount of AGS: 1.1 mmol/(g-carrier)). Subsequently, LLDPE, the AGS support and silica gel (specific surface area: 300 m$^2$/g, average particle size: 4 µm) as a physical adsorbing agent were mixed in a mass ratio of 90:3.7:6.3, and the resulting mixture was melt-kneaded at 170° C. with a twin screw kneading extruder to prepare an odor absorption layer masterbatch 1 (OD-MB1).

(Odor Absorption Layer Masterbatch 2)

LLDPE, AGS support and hydrophobic Y-type zeolite (specific surface area: 621 m$^2$/g, average particle size: 3 µm), a physical adsorbing agent, were mixed in a mass ratio of 84:6:10, and the resulting mixture was melt-kneaded at 170° C. with a twin screw kneading extruder to prepare an odor absorption layer masterbatch 2 (OD-MB2).

(Odor Absorption Layer Masterbatch 3)

An aqueous solution of 4-aminobenzenesulfonic acid ammonium salt (hereinafter, denoted as "SUA"), an amine compound, was impregnated into a silica powder (average particle size: 4 µm) and dried to yield an SUA support (supported amount of SUA: 1.0 mmol/(g-carrier)). Subsequently, LLDPE and the SUA support were mixed in a mass ratio of 85:15, and the resulting mixture was melt-kneaded at 170° C. with a twin screw kneading extruder to prepare an odor absorption layer masterbatch 3 (OD-MB3).

(Isolation Layer Masterbatch)

LLDPE and calcium hydroxide (food additive grade, average particle size: 5 µm) were melt-kneaded in a mass ratio of 85:15 at 170° C. with a twin screw kneading extruder to prepare an acidic gas absorbing agent masterbatch (CA-MB).

Example 1

(Preparation of Three-Layer Film Composed of Odor Absorption Layer/Oxygen Absorption Layer/Isolation Layer)

A mixed resin of LLDPE and OD-MB1 was used as the resin for the odor absorption layer, a mixed resin of syndiotactic 1,2-polybutadiene (hereinafter, denoted as "RB"), styrene-isoprene-styrene block copolymer (hereinafter, denotes as "SIS") and the OA-MB1 was used as the resin for the oxygen absorption layer, and a mixed resin of LLDPE and the CA-MB was used as the resin for the acidic gas absorption layer. The mixing ratios were set so as for the contents of the components in each of the layers to be as follows.

Odor absorption layer: LLDPE: 92 parts by mass, AGS support: 2.7 parts by mass, silica gel: 4.6 parts by mass Oxygen absorption layer: RB: 60 parts by mass, SIS: 10 parts by mass, LLDPE: 24 parts by mass, Co atoms: 0.3 part by mass Isolation layer: LLDPE: 98 parts by mass, calcium hydroxide: 1.5 parts by mass The mixed resins constituting the respective layers were co-extruded through T-dies in the order of odor absorption layer/oxygen absorption layer/isolation layer to form a film, so as for the thickness values of the respective layers to be 20 μm/20 μm/10 μm, and then the odor absorption layer side was subjected to a corona discharge treatment to yield a three-layer film. The extrusion temperature of the multilayer extruder was set at 180° C.

(Preparation of Oxygen-Absorbing Multilayer Body Composed of Gas Barrier Layer/Odor Absorption Layer/Oxygen Absorption Layer/Acidic Gas Absorption Layer)

On the odor absorption layer side of the prepared three-layer film, a stretched nylon film (thickness: 15 μm) and a silica vapor deposited PET film (thickness: 12 μm) were laminated in this order by dry lamination, and the resulting laminate was subjected to aging at 40° C. for 4 days to yield an oxygen-absorbing multilayer body having the silica vapor deposited PET film as a gas barrier layer.

For the oxygen-absorbing multilayer body prepared as described above, the oxygen absorption amount, the oxygen scavenging time in the enclosure of air, the odorous organic substance release concentrations and odor were evaluated by the above-described methods. The results thus obtained are shown in Table 1.

Example 2

A three-layer film and an oxygen-absorbing multilayer body were prepared in the same manner as in Example 1 except that RB, SIS and OA-MB1 were mixed so as for the contents of the components in the oxygen absorption layer to be as follows: RB: 40 parts by mass, SIS: 40 parts by mass, LLDPE: 16 parts by mass, and Co atoms: 0.2 part by mass. The performances of the oxygen-absorbing multilayer body were evaluated in the same manner as in Example 1. The results thus obtained are shown in Table 1.

Example 3

A three-layer film and an oxygen-absorbing multilayer body were prepared in the same manner as in Example 1 except that RB, SIS and OA-MB2 were mixed so as for the contents of the components in the oxygen absorption layer to be as follows: RB: 20 parts by mass, SIS: 60 parts by mass, LLDPE: 16 parts by mass, and Co atoms: 0.2 part by mass. The performances of the oxygen-absorbing multilayer body were evaluated in the same manner as in Example 1. The results thus obtained are shown in Table 1.

Example 4

A three-layer film and an oxygen-absorbing multilayer body were prepared in the same manner as in Example 1 except that OD-MB2 was used in place of OD-MB1, as the odor absorption layer masterbatch, and LLDPE and the odor absorption layer masterbatch were mixed so as for the contents of the components of the odor absorption layer to allow the content of the AGS support to be 3 parts by mass and the content of the hydrophobic Y-type zeolite to be 5 parts by mass. The performances of the oxygen-absorbing multilayer body were evaluated in the same manner as in Example 1. The results thus obtained are shown in Table 1.

Example 5

A three-layer film and an oxygen-absorbing multilayer body were prepared in the same manner as in Example 1 except that OD-MB3 was used in place of OD-MB1, as the odor absorption layer masterbatch, and LLDPE and the odor absorption layer masterbatch were mixed so as for the content of the components of the odor absorption layer to allow the content of the SUA support to be 5 parts by mass. The performances of the oxygen-absorbing multilayer body were evaluated in the same manner as in Example 1. The results thus obtained are shown in Table 1.

Example 6

A three-layer film and an oxygen-absorbing multilayer body were prepared in the same manner as in Example 1 except that as the resin for the oxygen absorption layer, a mixed resin composed of RB, styrene-butadiene-styrene block copolymer (hereinafter, denoted as "SBS") and above-described OA-MB1 was used, and RB, SBS and OA-MB1 were mixed so as for the contents of the components of the oxygen absorption layer to be as follows: RB: 70 parts by mass, SBS: 10 parts by mass, LLDPE: 16 parts by mass, and Co atoms: 0.2 part by mass. The performances of the oxygen-absorbing multilayer body were evaluated in the same manner as in Example 1. The results thus obtained are shown in Table 1.

Comparative Example 1

A three-layer film and an oxygen-absorbing multilayer body were prepared in the same manner as in Example 1 except that RB and OA-MB1 were mixed so as for the contents of the components of the oxygen absorption layer to be as follows: RB: 70 parts by mass, LLDPE: 24 parts by mass, and Co atoms: 0.3 part by mass. The performances of the oxygen-absorbing multilayer body were evaluated in the same manner as in Example 1. The results thus obtained are shown in Table 1.

Comparative Example 2

A three-layer film and an oxygen-absorbing multilayer body were prepared in the same manner as in Example 1 except that RB and OA-MB1 were mixed so as for the contents of the components of the oxygen absorption layer to be as follows: RB: 60 parts by mass, LLDPE: 32 parts by mass, and Co atoms: 0.4 part by mass. The performances of the oxygen-absorbing multilayer body were evaluated in the same manner as in Example 1. The results thus obtained are shown in Table 1.

Comparative Example 3

A three-layer film and an oxygen-absorbing multilayer body were prepared in the same manner as in Example 1 except that SIS and OA-MB1 were mixed so as for the contents of the components of the oxygen absorption layer to be as follows: SIS: 80 parts by mass, LLDPE: 16 parts by mass, and Co atoms: 0.2 part by mass. The performances of the oxygen-absorbing multilayer body were evaluated in the same manner as in Example 1. The results thus obtained are shown in Table 1.

TABLE 1

| | Contents of components in oxygen absorption layer [parts by mass] | | | | Oxygen absorption amounts[1] [mL/cm²] | | Oxygen scavenging time[1] | Odorous organic substance release concentrations [ppm] | | | |
|---|---|---|---|---|---|---|---|---|---|---|---|
| | RB | SIS | SBS | Co | After 24 hours | After 48 hours | [h] | Aldehydes | Carboxylic acids | Odor | Remark |
| Example 1 | 60 | 10 | | 0.3 | 0.10 | 0.14 | 47 | 14 | 9 | + | |
| Example 2 | 40 | 40 | | 0.2 | 0.05 | 0.15 | 37 | 30 | >10 | ++ | |
| Example 3 | 20 | 60 | | 0.2 | 0.08 | 0.14 | — | — | — | ++ | |
| Example 4 | 60 | 10 | | 0.3 | 0.09 | 0.12 | 65 | 20 | 8 | + | Zeolite was added. |
| Example 5 | 60 | 10 | | 0.3 | 0.09 | 0.12 | 67 | 15 | 2 | + | SUA support was added. |
| Example 6 | 70 | | 10 | 0.2 | 0.00 | 0.07 | — | — | — | + | |
| Comparative Example 1 | 70 | | | 0.3 | 0.00 | 0.07 | 98 | 5 | <2 | — | |
| Comparative Example 2 | 60 | | | 0.4 | 0.00 | 0.09 | 120 | — | — | — | |
| Comparative Example 3 | | 80 | | 0.2 | 0.10 | 0.19 | — | — | — | +++ | |

[1]Measured by enclosing air

[Odor evaluation]
0: No offensive smell occurs.
+: Slight offensive smell is sensed.
++: Some offensive smell is sensed.
+++: Offensive smell is sensed.

Example 7

A three-layer film and an oxygen-absorbing multilayer body were prepared in the same manner as in Example 1 except that RB, SIS and OA-MB1 were mixed so as for the contents of the components of the oxygen absorption layer to be as follows: RB: 70 parts by mass, SIS: 10 parts by mass, LLDPE: 16 parts by mass, and Co atoms: 0.2 part by mass. The performances of the oxygen-absorbing multilayer body were evaluated in the same manner as in Example 1. The oxygen scavenging time measurement was performed in the same manner as in Example 1 except that a 2 vol % oxygen-98 vol % nitrogen gas was enclosed in place of air. The results thus obtained are shown in Table 2.

Example 8

A three-layer film and an oxygen-absorbing multilayer body were prepared in the same manner as in Example 7 except that RB, SIS, LLDPE and OA-MB1 were mixed so as for the contents of the components of the oxygen absorption layer to be as follows: RB: 20 parts by mass, SIS: 10 parts by mass, LLDPE: 66 parts by mass, and Co atoms: 0.2 part by mass. The performances of the oxygen-absorbing multilayer body were evaluated in the same manner as in Example 7. The results thus obtained are shown in Table 2.

Comparative Example 4

A three-layer film and an oxygen-absorbing multilayer body were prepared in the same manner as in Example 7 except that RB, LLDPE and OA-MB1 were mixed so as for the contents of the components of the oxygen absorption layer to be as follows: RB: 30 parts by mass, LLDPE: 66 parts by mass, and Co atoms: 0.2 part by mass. The performances of the oxygen-absorbing multilayer body were evaluated in the same manner as in Example 7. The results thus obtained are shown in Table 2.

TABLE 2

| | Contents of components in oxygen absorption layer [parts by mass] | | | Oxygen absorption amounts[1] [mL/cm²] | | Oxygen scavenging time[1] | Odorous organic substance release concentrations [ppm] | | |
|---|---|---|---|---|---|---|---|---|---|
| | RB | SIS | Co | After 24 hours | After 48 hours | [h] | Aldehydes | Carboxylic acids | Odor |
| Example 7 | 70 | 10 | 0.2 | 0.12 | 0.15 | 12 | <2 | 0.1 | + |
| Example 8 | 20 | 10 | 0.2 | 0.08 | 0.09 | 12 | <2 | <0.1 | + |
| Comparative Example 4 | 30 | | 0.2 | 0.00 | 0.03 | >72 | <2 | <0.1 | + |

[1]Measured by enclosing a 2 vol % oxygen-98 vol % nitrogen gas

[Odor evaluation]
0: No offensive smell occurs.
+: Slight offensive smell is sensed.
++: Some offensive smell is sensed.
+++: Offensive smell is sensed.

As can be seen from Examples 1 to 6, it has been verified that the oxygen-absorbing multilayer bodies of the present invention exhibit satisfactory oxygen absorption performance even when no photoinitiator is included, and comparatively suppress the occurrence of odor. On the other hand, in Comparative Examples 1 and 2 using only RB as the easily oxidizable thermoplastic resin, as compared to Examples 1 to 6, the oxygen absorption amount was small and the oxygen scavenging time was 4 days or more, needing a long period of time for the oxygen concentration to be equal to or less than 0.1 vol %. In Comparative Example 3 using only SIS as the easily oxidizable thermoplastic resin, offensive smell occurred when oxygen was absorbed.

Example 9

RB, SIS and OA-MB1 were melt-kneaded at 160° C. with a twin screw kneading extruder to prepare an oxygen-absorbing resin composition in which the contents of the components were as follows: RB: 60 parts by mass, SIS: 10 parts by mass, and Co atoms: 0.3 part by mass. The resulting oxygen-absorbing resin composition was hot pressed to yield a single layer film having a thickness of 100 μm.

The oxygen absorption performance of the single layer film was evaluated by the following procedure. The single layer film was cut out to a size of 50 mm×60 mm to prepare a specimen, and the resulting single layer film specimen was irradiated with the ultraviolet ray of an illuminance of 9.8 mW/cm$^2$ from a 1-kW high-pressure mercury lamp as a light source for 30 seconds (integrated light amount: 293 mJ/cm$^2$) or 90 seconds (integrated light amount: 880 mJ/cm$^2$). Subsequently, the single layer film specimen was enclosed in an oxygen barrier bag together with 240 mL of air, and the bag was sealed. Then, the bag was allowed to stand under the conditions of 25° C. and 60% RH. After being allowed to stand for 24 hours and 48 hours, the oxygen concentrations in the bag were measured, and the oxygen absorption amounts per 1 g of the single layer film were calculated. The results thus obtained are shown in Table 3.

Example 10

RB, SIS, OA-MB1 and 9-fluorenone (hereinafter, denoted as "FL") were melt-kneaded in the same manner as in Example 9 to prepare an oxygen-absorbing resin composition in which the contents of the components were as follows: RB: 60 parts by mass, SIS: 10 parts by mass, Co atoms: 0.3 part by mass, and FL: 0.05 part by mass. Then, preparation of a single layer film and the evaluation of the oxygen absorption performance were performed in the same manner as in Example 9. The results thus obtained are shown in Table 3.

Example 11

RB, SIS, OA-MB1 and FL were melt-kneaded in the same manner as in Example 9 to prepare an oxygen-absorbing resin composition in which the contents of the components were as follows: RB: 60 parts by mass, SIS: 10 parts by mass, Co atoms: 0.3 part by mass, and FL: 0.025 part by mass. Then, preparation of a single layer film and the evaluation of the oxygen absorption performance were performed in the same manner as in Example 9. The results thus obtained are shown in Table 3.

Comparative Example 5

An oxygen-absorbing resin composition and a single layer film were prepared in the same manner as in Example 10 except that the mixing amount of RB was set at 70 parts by mass, and the mixing of SIS was omitted. The oxygen absorption performance of the resulting single layer film was performed in the same manner as in Example 10. The results thus obtained are shown in Table 3.

TABLE 3

| | Contents of components in oxygen-absorbing resin [parts by mass] | | | | Oxygen absorption amounts [mL/g] | | | |
|---|---|---|---|---|---|---|---|---|
| | | | | | Light amount: 293 mJ/cm$^2$ | | Light amount: 880 mJ/cm$^2$ | |
| | RB | SIS | Co | FL | After 24 hours | After 48 hours | After 24 hours | After 48 hours |
| Example 9 | 60 | 10 | 0.3 | 0 | 0.0 | 0.0 | 3.2 | 33.7 |
| Example 10 | 60 | 10 | 0.3 | 0.05 | 30.3 | 51.2 | 42.1 | 53.2 |
| Example 11 | 60 | 10 | 0.3 | 0.025 | 28.2 | 57.3 | 37.5 | 47.1 |
| Comparative Example 5 | 70 | 0 | 0.3 | 0.05 | 15.2 | 39.9 | 40.3 | 53.6 |

As can be seen from Examples 9 to 11, it has been shown that the oxygen-absorbing resin compositions of the present invention are further improved in the oxygen absorption performance by adding the photoinitiator. It has been revealed that by adding the photoinitiator to the oxygen-absorbing resin compositions of the present invention, even when the irradiation time of the ultraviolet ray is made shorter to reduce the integrated light amounts from 880 mJ/cm$^2$ to 293 mJ/cm$^2$, the oxygen absorption amounts after 24 hours are smaller in the reduction rate as compared to the oxygen absorption amount of Comparative Example 5, and the oxygen absorption amounts after 48 hours exhibit the oxygen absorption performances equal to or higher than the oxygen absorption performances before the irradiation time reduction (before the integrated light amount reduction). These results show that the oxygen-absorbing resin compositions of the present invention are higher in the sensitivity to the ultraviolet ray irradiation.

Next, the evaluation of the exterior appearance of the oxygen-absorbing multilayer bodies was performed on the basis of Examples and Comparative Examples presented below. The evaluation of the exterior appearance was performed by the evaluation method presented below.

(Evaluation of Exterior Appearance)

Each of the oxygen-absorbing multilayer bodies was cut to a size of 390 mm in width×1000 mm in length to prepare a specimen, and the number of gels of 1 mm or more in diameter produced in the specimen was counted.

In Examples and Comparative Examples presented below, the following different masterbatches were used to prepare oxygen-absorbing multilayer bodies.

(Oxygen Absorption Layer Masterbatch)

A cobalt octylate solution (cobalt octylate:solvent=1:1 mass ratio, Co content: 8% by mass) and a synthetic silica powder (average particle size: 2 µm) were mixed in a mass ratio of 0.9:1 to yield a powder-like product. The obtained powder-like product and a linear low-density polyethylene (hereinafter, denoted as "LLPDE") were melt-kneaded in a mass ratio of 15:85 at 170° C. with a twin screw kneading extruder to prepare an oxygen absorption layer masterbatch 2 (OA-MB2).

(Odor Absorption Layer Masterbatch 4)

An aqueous solution of aminoguanidine sulfate (hereinafter, denoted as "AGS"), an amine compound, was impregnated into a silica powder (average particle size: 4 µm) and dried to yield an AGS support (supported amount of AGS: 1.1 mmol/(g-carrier)). Subsequently, LLDPE and the AGS support were mixed in a mass ratio of 85:15, and the resulting mixture was melt-kneaded at 170° C. with a twin screw kneading extruder to prepare an odor absorption layer masterbatch 4 (OD-MB4).

(Isolation Layer Masterbatch)

LLDPE and calcium hydroxide (food additive grade, average particle size: 5 µm) were melt-kneaded in a mass ratio of 85:15 at 170° C. with a twin screw kneading extruder to prepare an acidic gas absorbing agent masterbatch (CA-MB).

Example 12

(Preparation of Three-Layer Film Composed of Odor Absorption Layer/Oxygen Absorption Layer/Isolation Layer)

A mixed resin of LLDPE and OD-MB1 was used as the resin for the odor absorption layer, a mixed resin of syndiotactic 1,2-polybutadiene (hereinafter, denoted as "RB"), styrene-isoprene-styrene block copolymer (hereinafter, denotes as "SIS") and the OA-MB2 was used as the resin for the oxygen absorption layer, and a mixed resin of LLDPE and the CA-MB was used as the resin for the acidic gas absorption layer. The mixing ratios were set so as for the contents of the components in each of the layers to be as follows.

Odor absorption layer: LLDPE: 97 parts by mass, AGS support: 3.0 parts by mass

Oxygen absorption layer: RB: 60 parts by mass, SIS: 10 parts by mass, LLDPE: 24 parts by mass, Co atoms: 0.12 part by mass Isolation layer: LLDPE: 98 parts by mass, calcium hydroxide: 1.5 parts by mass The mixed resins constituting the respective layers were co-extruded through T-dies in the order of odor absorption layer/oxygen absorption layer/isolation layer to form a film, so as for the thickness values of the respective layers to be 20 µm/20 µm/10 µm, to yield a three-layer film. The extrusion temperature of the multilayer extruder was set at 180° C.

The number of the generated gels in the obtained three-layer film was counted, and the result is shown in Table 4.

Example 13

A three-layer film was prepared in the same manner as in Example 12 except that RB and OA-MB were mixed so as for the contents of the components of the oxygen absorption layer to be as follows: RB: 60 parts by mass, SIS: 10 parts by mass, LLDPE: 24 parts by mass, Co atoms: 0.12 part by mass, and a photoinitiator [9-fluorenone (FL)]: 0.05 part by mass. The number of the generated gels of the obtained three-layer film is shown in Table 4.

Example 14

A three-layer film was prepared in the same manner as in Example 12 except that RB and OA-MB were mixed so as for the contents of the components of the oxygen absorption layer to be as follows: RB: 60 parts by mass, SIS: 10 parts by mass, LLDPE: 24 parts by mass, Co atoms: 0.12 part by mass, and a photoinitiator [9-fluorenone (FL)]: 0.3 part by mass. The number of the generated gels of the obtained three-layer film is shown in Table 4.

Example 15

A three-layer film was prepared in the same manner as in Example 14 except that the extrusion temperature of the multilayer extruder was set at 170° C. The number of the generated gels of the obtained three-layer film is shown in Table 4.

TABLE 4

| | Contents of components in oxygen absorption layer [parts by mass] | | | | Number of generated gels |
|---|---|---|---|---|---|
| | RB | SIS | Co | PI (FL) | [number/m$^2$] |
| Example 12 | 60 | 10 | 0.12 | | 3 |
| Example 13 | 60 | 10 | 0.12 | 0.05 | 5 |
| Example 14 | 60 | 10 | 0.12 | 0.3 | 12 |
| Example 15 | 60 | 10 | 0.12 | 0.3 | 5 |

As can also be seen from Example 12, it has been verified that in the oxygen-absorbing resin composition of the present invention, with the decrease of the content of the photoinitiator, the number of the generated gels becomes smaller.

It is to be noted that the present application claims the priority based on Japanese Patent Application No. 2012-196994 filed Sep. 7, 2012 at the Japan Patent Office and Japanese Patent Application No. 2013-020269 filed Feb. 5, 2013 at the Japan Patent Office, the contents of which are incorporated herein by reference.

INDUSTRIAL APPLICABILITY

As described above in detail, the oxygen-absorbing resin composition and the oxygen-absorbing multilayer body of the present invention can be used widely and effectively in the fields of packaging, storing or quality preservation of various goods tending to be affected by oxygen and accordingly deteriorated or degraded, such as food, beverages, pharmaceuticals, medical supplies, cosmetics, metal products and electronic products. Specifically, the oxygen-absorbing resin composition and the oxygen-absorbing multilayer body of the present invention can be used in the whole or a part of an oxygen absorbing agent or an oxygen absorbing vessel. In particular, for example, the oxygen-absorbing resin composition of the present invention can be reduced in the content of the photoinitiator as compared to conventional oxygen-absorbing resin compositions while the satisfactory oxygen absorption performance thereof is being maintained, is suppressed in the occurrence of odor after oxygen absorption, allows multilayer bodies excellent in transparency and beauty of exterior appearance to be produced simply and conveniently, and hence is particularly effectively usable in particular in the field of the food packaging material.

REFERENCE SIGNS LIST

10: Oxygen-absorbing multilayer body
11: Odor absorbing agent
(A): Isolation layer
(B): Oxygen absorption layer formed of oxygen-absorbing resin composition
(C): Odor absorption layer formed of odor-absorbing resin composition
(D): Oxygen barrier layer

The invention claimed is:

1. An oxygen-absorbing resin composition initiating oxygen absorption by irradiation with an energy ray, the composition comprising:
    an oxidizable thermoplastic resin and
    a transition metal catalyst,
    wherein the oxidizable thermoplastic resin comprises a polybutadiene (X) and a resin (Y) having carbon-carbon double bonds and the constitutional unit represented by the following general formula (1):

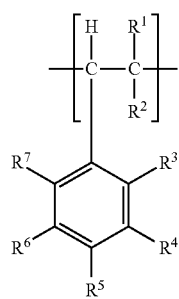

(1)

wherein $R^1$ to $R^7$ each represent —H, —$CH_3$, —$CH_2R$, —$CHR_2$, —$CR_3$, —OR, —COOR, —$SiR_3$, —O—$SiR_3$, —COCl or a halogen atom, and may be the same as each other or different from each other, and R represents a linear or cyclic alkyl, alkenyl, halogenated alkyl, halogenated alkenyl or aryl group and wherein the resin (Y) comprises a styrene-isoprene-styrene block copolymer and/or a styrene-butadiene-styrene block copolymer,
    the resin (Y) is contained in an amount of 3 to 1000 parts by mass based on 100 parts by mass of the polybutadiene (X),
    (i) the transition metal catalyst is contained in an amount of 0.001 to 10 parts by mass, in terms of the transition metal amount, based on 100 parts by mass of the oxygen-absorbing resin composition, and
    (ii) the oxygen-absorbing resin composition further comprises a photoinitiator in an amount of 0% by mass or more and less than 0.001% by mass based on the total amount of the oxygen-absorbing resin composition.

2. An oxygen-absorbing multilayer body comprising at least an oxygen absorption layer comprising the oxygen-absorbing resin composition according to claim 1.

3. The oxygen-absorbing multilayer body according to claim 2, formed by laminating the following layers in the mentioned order:
    an isolation layer (A) comprising a thermoplastic resin;
    an oxygen absorption layer (B) comprising the oxygen-absorbing resin composition;
    an odor absorption layer (C) comprising an odor-absorbing resin composition comprising a thermoplastic resin and an odor absorbing agent; and
    an oxygen barrier layer (D) comprising an oxygen barrier substance.

* * * * *